(No Model.)
J. N. RUDD.
FRUIT GATHERER.
No. 338,303. Patented Mar. 23, 1886.
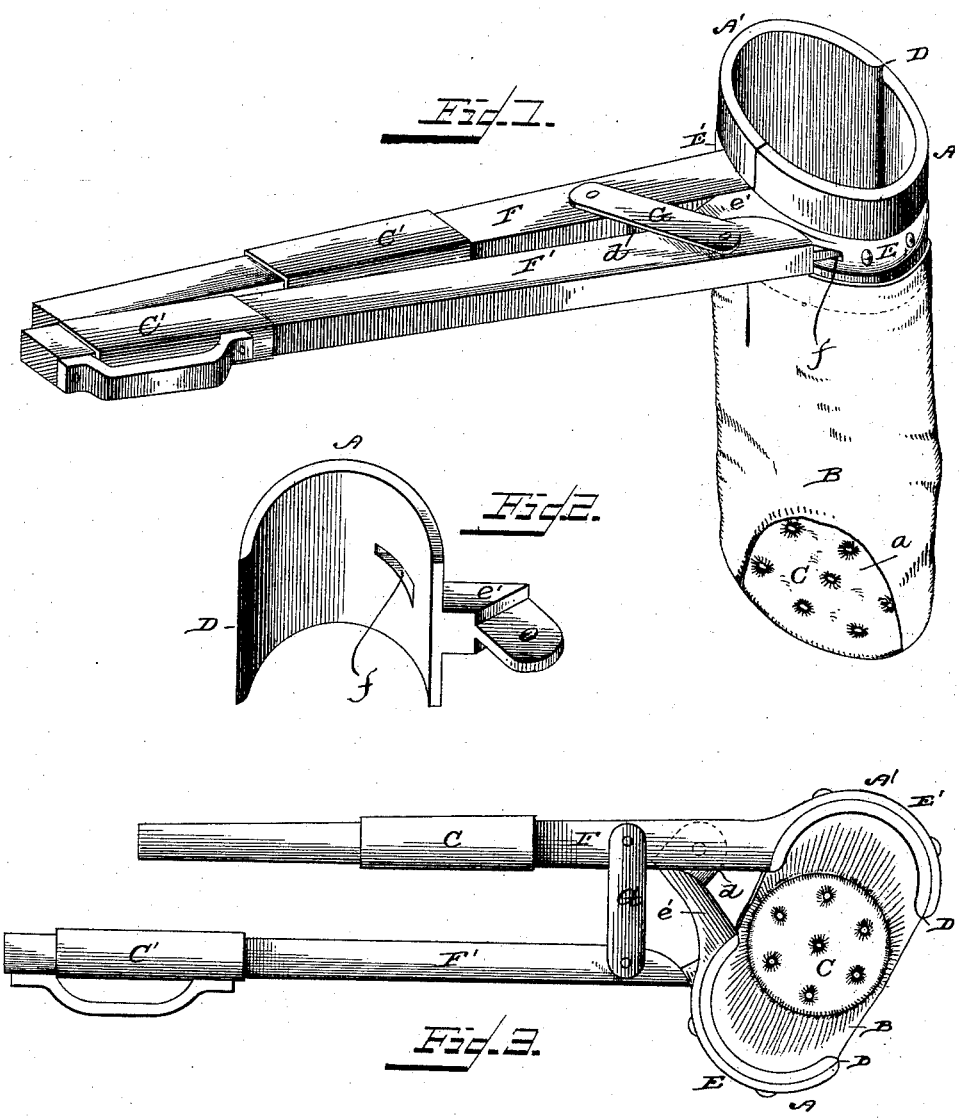
WITNESSES
INVENTOR
John N. Rudd.
By, Attorneys

UNITED STATES PATENT OFFICE.

JOHN NORWOOD RUDD, OF SPARTA, TENNESSEE, ASSIGNOR OF ONE-HALF TO SAMUEL PARKER, OF SAME PLACE.

FRUIT-GATHERER.

SPECIFICATION forming part of Letters Patent No. 338,303, dated March 23, 1886.

Application filed June 25, 1885. Serial No. 169,758. (No model.)

*To all whom it may concern:*

Be it known that I, JOHN NORWOOD RUDD, a citizen of the United States, residing at Sparta, in the county of White and State of Tennessee, have invented a new and useful Improvement in Fruit-Gatherers, of which the following is a specification, reference being had to the accompanying drawings.

My invention relates to fruit-gatherers, and to that class in which the fruit after being pulled or severed from the tree is conducted through a conveyer to a suitable receptacle placed upon the ground, the object being to provide improved means for cutting or severing the fruit.

A further object of the invention is to provide a fruit-gatherer which shall be simple in its construction, one that can be readily and easily operated, and will effectually prevent the fruit from becoming bruised, and to provide a fruit-gatherer which shall be light yet thoroughly durable.

With these ends in view the invention consists in the improved construction and combinations of parts, hereinafter fully described, and pointed out in the claim.

In the drawings, Figure 1 is a perspective view showing my device in use. Fig. 2 is a detail perspective view of one of the jaws. Fig. 3 is a plan view of the gatherer, showing the mouth thereof opened.

In the accompanying drawings, in which like letters of reference indicate corresponding parts in all the figures, A A' represent two jaws, which are preferably semicircular in form, and have the flexible conveyer B secured to their lower edges. The conveyer is considerably larger at its upper ends than are the jaws when closed, to permit said jaws to be opened.

In the bottom of the conveyer B is a cushioned strip, C, upon which the fruit strikes in its downward travel or descent to the receptacle placed under the conveyer. The cushion, intercepting or interrupting the descent of the fruit, prevents the same from being broken or bruised by striking the receptacle, an opening, *a*, being made in the conveyer to permit the escape of the fruit.

Secured to or formed integral with the edges of the jaws A A' are vertically-arranged cutting-knives D, which, when said jaws are brought together, sever the fruit from the tree and cause it to drop into the conveyer B.

Riveted or otherwise firmly secured to the outer sides of the jaws A A' are metal plates E E'. Projecting from the plate E' is an integral handle, F, which is formed in sections held together by metallic sleeves *c'*. The handle F is formed with an opening, *d*, in which is pivoted the end of an extension, *e'*, projecting from the plate E. It will be observed that the jaws A A' are thus pivotally connected.

Pivoted in a recess, *f*, of the jaw A and the plate E is a handle, F', by which said jaw may be opened and closed. Pivotally connecting the handles F and F' upon the upper and lower sides thereof are plates G, which plates are on a horizontal line when the jaws A A' are opened, but which, when the jaws are closed, assume an inclined position. These plates G serve to brace and strengthen the handles and remove the strain from the pivot-point.

It will be observed that in the operation of the device the jaw A' and handle F remain stationary, while the jaw A is moved by the handle F' to sever or pull the fruit. It will also be observed that the device before described may be employed for picking berries as well as fruit.

Having thus described my invention, what I claim is—

The combination, with the conveyer, of the pair of severing jaws secured to opposite sides of the conveyer at the open end, and each jaw forming one-half of the circumference of said conveyer, and parallel straight handles sliding one alongside of the other, one of the handles being pivoted to the other by a link and worked back and forth, while the other is held rigid, as set forth.

In testimony that I claim the foregoing as my own I have hereto affixed my signature in presence of two witnesses.

JOHN NORWOOD RUDD.

Witnesses:
J. D. GOFF,
JOHN PRICE.